United States Patent
Hannig et al.

(10) Patent No.: US 10,052,818 B2
(45) Date of Patent: Aug. 21, 2018

(54) METHOD FOR PRODUCING A DECORATED, SURFACE-STRUCTURED LAMINATE

(71) Applicant: SURFACE TECHNOLOGIES GMBH & CO. KG, Baruth (DE)

(72) Inventors: Hans-Jürgen Hannig, Bergisch Gladbach (DE); Carsten Buhlmann, Rangsdorf (DE)

(73) Assignee: Surface Technologies GmbH & Co. KG, Beruth (DE)

( * ) Notice: Subject to any disclaimer, the term of this patent is extended or adjusted under 35 U.S.C. 154(b) by 417 days.

(21) Appl. No.: 14/774,189

(22) PCT Filed: Mar. 13, 2014

(86) PCT No.: PCT/EP2014/055002
§ 371 (c)(1),
(2) Date: Sep. 10, 2015

(87) PCT Pub. No.: WO2014/146973
PCT Pub. Date: Sep. 25, 2014

(65) Prior Publication Data
US 2016/0016357 A1    Jan. 21, 2016

(30) Foreign Application Priority Data
Mar. 18, 2013 (EP) ..................... 13159816

(51) Int. Cl.
| | | |
|---|---|---|
| *B44F 9/02* | (2006.01) | |
| *B29C 59/04* | (2006.01) | |
| *B29C 65/56* | (2006.01) | |
| *B30B 5/04* | (2006.01) | |
| *B32B 38/06* | (2006.01) | |
| *B32B 3/00* | (2006.01) | |
| *B44F 9/04* | (2006.01) | |
| *B29L 7/00* | (2006.01) | |

(52) U.S. Cl.
CPC ............ *B29C 65/56* (2013.01); *B29C 59/046* (2013.01); *B30B 5/04* (2013.01); *B32B 3/00* (2013.01); *B32B 38/06* (2013.01); *B44F 9/02* (2013.01); *B44F 9/04* (2013.01); *B29L 2007/001* (2013.01); *B29L 2007/002* (2013.01); *B32B 2419/00* (2013.01); *B32B 2451/00* (2013.01); *B32B 2607/00* (2013.01)

(58) Field of Classification Search
None
See application file for complete search history.

(56) References Cited

U.S. PATENT DOCUMENTS

| | | |
|---|---|---|
| 5,149,394 A | 9/1992 | Held |
| 5,596,912 A | 1/1997 | Laurence et al. |
| 2004/0074191 A1 | 4/2004 | Garcia |
| 2009/0008705 A1 | 1/2009 | Zhu et al. |
| 2011/0226408 A1 | 9/2011 | Melzer et al. |

OTHER PUBLICATIONS

International Search Report, PCT/EP2014/055002, dated Jun. 4, 2014, 3 pages.

*Primary Examiner* — Barbara J Musser
(74) *Attorney, Agent, or Firm* — Senniger Powers LLP

(57) ABSTRACT

A press plate arrangement having a plurality of surface-structured press plates for introducing surface structures in a material to be pressed, said press plate arrangement forming a closed band structure. A method for producing a decorative panel having a surface structure that substantially matches the decorative pattern.

14 Claims, 2 Drawing Sheets

METHOD FOR PRODUCING A DECORATED, SURFACE-STRUCTURED LAMINATE

REFERENCE TO RELATED APPLICATIONS

This application is a U.S. national stage application of International Patent Application No. PCT/EP2014/055002, filed Mar. 13, 2014, and claims the benefit of priority of European Application No. 13159816.1, filed Mar. 18, 2013, the entire disclosures of which are incorporated herein by reference.

FIELD OF THE INVENTION

The present invention relates to a press plate arrangement including a plurality of surface-structured press plates for introducing surface structures in a material to be pressed, wherein the press plate arrangement forms a closed belt structure. Moreover, the present invention relates to a method for producing a decorative panel or laminate comprising a surface structure substantially matching with the decoration.

In the production of laminated materials, such as laminates or decorative panels, usually a stack of layers is compressed to a workpiece under the action of pressure and/or heat. Such a compression can be carried out semi-continuously or continuously in industrial use. In the semi-continuous compression so-called short cycle presses are used, in which the material to be pressed, i.e. the stack of layers to be compressed, is arranged between a press table and a press plunger and is compressed by the force provided by the press plunger. The press plunger comprises a press plate at its side facing to the material to be pressed. Here, the surface of the press plate is formed depending on the structure to be produced on the material to be pressed. For example, if a smooth, possibly highly glossy surface is to be formed on the material to be pressed, mirror polished press plungers are used. If specific three-dimensional structures are to be introduced in the surface of the material to be pressed, the press plates used have a corresponding inverted structure. Both the mirror glossy surface and the three-dimensional structured surface is formed usually by means of galvanochemical processes and optionally mechanical finishing.

In continuous compressing often so-called double belt presses are used, in which the material to be pressed is clamped between two press belts moving in the same direction and is compressed by reducing the press nip between the belts in the conveying direction. Here, too, it can be provided that the surface of the press belt facing to the material to be pressed is treated in particular galvanochemical in order to produce the desired surface structure thereon which is to be transferred to the material to be pressed. In industrial applications such press belts nowadays have lengths of over 100 m such that in particular the galvanic treatment of such press belts is difficult, for example their hard chromium plating in order to improve the service life of the belts. The result is that press belts are significantly more expensive than press plates. On the other hand double belt presses have a significantly higher throughput of the material to be pressed compared to short cycle presses, since double belt presses need no dead times for supplying and discharging the material to be pressed to/from the press. Another disadvantage of double belt presses against short cycle presses is the alignment problematic of the material to be pressed relative to the press belt. While normally no exact alignment of the material to be pressed relative to the press belt is necessary for unstructured surfaces because the press surface of the press belt is identical at any point, a highly precise alignment of the material to be pressed relative to the structure in the press belt is always necessary if this structure should match with a decorative image of the material to be pressed. This is for example the case with decorative panels, in which a haptic structure simulating for example a wood grain is to be introduced in the surface of a panel.

In particular in the case of the panels described above, it is desired in the market that the offered decoration exhibits a low repetition rate, so that it is possible to be able to cover even large surface areas without any repetition in the decor. While this is with respect to the decoration for example by using direct printing processes, such as digital printing process, the provision of respective decoration synchronous surface structures is very costly and technically difficult for such a decoration variance because press plates have either to be provided a plurality of presses, or the presses have to be retrofitted in accordance with the respective decoration, which is very time consuming.

SUMMARY OF THE INVENTION

It is therefore an object of the present invention to provide a press plate arrangement which enables a high throughput of material to be pressed with a precise alignment of the material to be pressed with respect to the surface structure of the press plate while enabling a simple production process. Moreover, it is an object of the present invention to provide a high-throughput method for producing a decorated surface-structured laminate, in particular a decorative panel, in which the surface structure is aligned substantially synchronous with respect to the decoration.

This object is achieved with respect to the device by a press plate arrangement according to claim 1 and with respect to the method by a method according to claim 9.

DETAILED DESCRIPTION OF PREFERRED EMBODIMENTS

Figure 1:
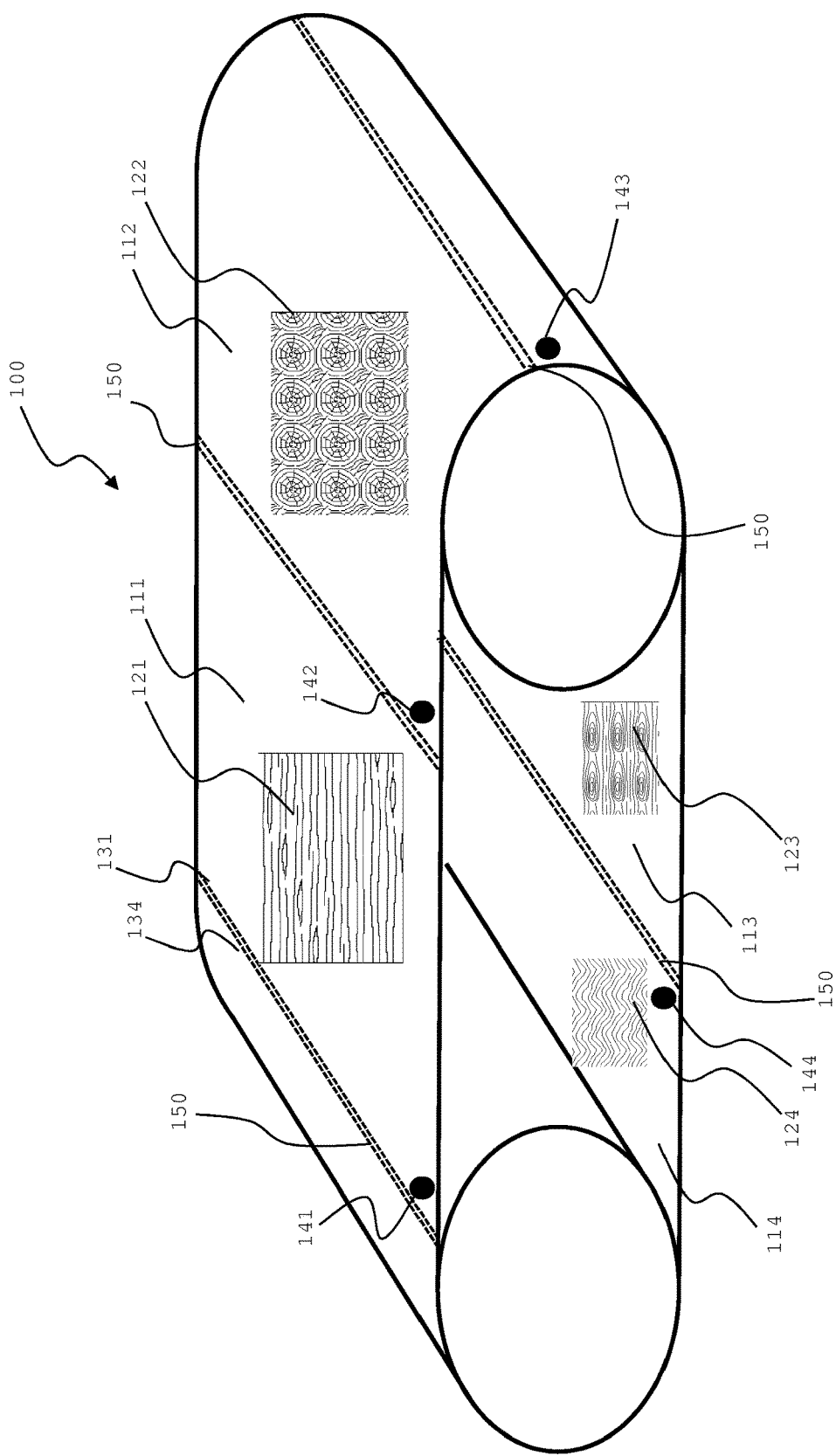
FIG. 1 shows an embodiment of a press plate arrangement according to the invention.

Thus, a press plate arrangement for producing a decorative panel is proposed, comprising a plurality of press plates $P_1$ to $P_n$, wherein $n \geq 4$, preferably $n \geq 5$, particularly preferably $n \geq 6$, wherein the press plates have a structure for introducing surface structures in a material to be pressed, which is characterized in that the press plates $P_1$ to $P_n$ are connected to each another via their end faces, wherein the first press plate $P_1$ and the last press plate $P_n$ are connected to each another via their end faces such that the press plate arrangement as a whole forms a closed belt structure.

With the press plate arrangement according to the invention it is possible to produce press belts in segments of individual press plates, which are assembled to a belt structure only after their structuring and optionally a surface finishing treatment, such as chrome plating. This enables to provide press belts at much lower costs because the plant-specific preconditions for the production of individual press plates are significantly less sophisticated than the preconditions for the production and processing of closed press belts.

According to a preferred embodiment a press plate arrangement for producing a decorative panel is proposed, comprising a plurality of press plates $P_1$ to $P_n$, wherein n≥4, preferably n≥5, particularly preferably n≥6, wherein the press plates have a structure for introducing surface structures in a material to be pressed, which is characterized in that the press plates $P_1$ to $P_n$ have mutually different structures $S_1$ to $S_n$ and are connected to each other via their end faces, wherein the first press plate $P_1$ and the last press plate $P_n$ are connected to each another via their end faces such that the press plate arrangement as a whole forms a closed belt structure.

The plate arrangement according to the invention enables to produce press plates in the manner known from the prior art, and then to assemble them to a press belt of a desired length. Thus the press plate arrangement according to the invention allows to assemble press plates with different structures to a press belt to be used in a double belt press, such that it is enabled, for example, in combination with a corresponding decoration variance to produce surface-structured decorative laminates having a significantly lower repetition of decoration. This allows, for example, in the manufacture of laminate floor coverings with a decoration synchronous surface structure to provide panels for a decoration repetition-free installation of considerably larger surface areas, such as, for example ≥25 $m^2$ without requiring an expansion of the machinery at the manufacturer's side.

According to one embodiment of the invention, the press plates are connected to each other at their end faces by a material-closure joint. To this end, it may in particular be provided that the plates are welded or glued to each other.

According to a preferred embodiment of the invention a connecting area is formed at the end faces of the press plates, which in the direction of the longitudinal extension of the press plates has respectively an extension between ≥1 mm and ≤2.5 cm preferably between ≥2 mm and ≤7.5 mm, such that a total extension of the connecting area between two interconnected press plates between ≥2 mm and ≤5 cm, preferably between ≥5 mm and ≤1.5 cm is obtained. It is particularly preferred if the connecting area with the exception of grinding and/or polishing does not comprise anyfurther surface processing.

According to a further embodiment of the invention, the connecting areas are formed pressure-tightly between two press plates, so that an oil or gas pressure being present on one surface side of a press plate cannot escape via the connecting areas.

Alternatively, it may be provided that the press plates are releasably connected to each other at their end faces. For releasably connecting the plates to each other they can, for example, comprise recesses synchronously arranged relative to each other, by means of which the press plates can be connected to each other by inserting a connecting element, such as a rivet or a screw.

According to a further embodiment of the invention it can be provided that the press plates at their end faces comprise form-fitting interlocking form elements offset from each other. As a result, the edge length along which the press plates are connected to each other are significantly increased, so that the tensile stress of the connection between the press plates occurring during the pressing operation can be distributed over a larger surface area and can thus be reduced per unit area.

According to a further preferred embodiment of the invention it can be provided that the form-fitting interlocking form elements have undercuts. Such undercuts on the one hand result in a further increase of the contact area between the end faces of the press plates to be connected to each other, and on the other hand by means of the undercuts tensile forces occurring in the pressing operation can be better introduced into the press plate material, resulting in a further reduction of the load of the plate joints, such as welds or bonds.

According to a further embodiment of the invention it may be in particular provided that the press plates are connected to each other without further connecting means. For this purpose it can be provided that the interlocking form elements are configured as hook elements by means of which the press plates can be hooked into each other. It may in particularly be provided that the hook elements alternately protrude in opposite directions from the plane of the press plate.

According to a further embodiment of the invention it can be provided that the press plates have positioning marks by means of which the position of a press plate relative to a material to be pressed can be determined. Such positioning marks may be preferably formed of optical, magnetic and/or electronic marking means. Examples of optical marks are those which can be read by optical means, such as cameras or light barriers. Here, a simple form of an optical marking means is a recess in the press plate which can be transmitted by a light beam of a light barrier and thus a certain position of the press plate can be detected by triggering the light barrier. Alternatively optical patterns which can be read by a camera can be disposed on the press plate, which allow to derive information on the position of the press plate by use of appropriate pattern recognition algorithms. Examples for magnetic marking means include for example magnetic elements which trigger a magnetic contact when the press plate reaches a predetermined position within the press and thus allow to derive precise information on the plate position. An electronic marking means may be for example be a RFID (Radio Frequency Identification) element, which is read by a suitable read-out system at a certain point of the press and thus allows to derive information on the position of the respective press plate within the press. Here, it may be in particular provided that a plurality of marking means, even of different type, is provided in order to increase the precision in determining the plate position within the press. Based on the exact position of the press plate within the press plate subsequently an alignment of the material to be pressed relative to the press plate can be implemented in order to ensure a decoration synchronous introduction of a surface structure in the material to be pressed. In particular, the marking means are adapted to allow an alignment of the material to be pressed relative to the press plate in such a way that the connecting area formed between two press plates matches with a gap between two materials to be pressed.

The individual press plates in the press plate arrangement according to the invention can, for example, have a thickness in the range between ≥1.0 mm and ≤4.0 mm, preferably between ≥1.5 mm and ≤2.5 mm. The length of the individual press plates can for example lie in a range between ≥2.0 m and ≤6.0 m, preferably between ≥2.5 m and ≤5.0 m, and the width of the individual press plates may lie in a range between ≥0.8 m and ≤4.0 m, preferably between ≥1.5 m and ≤3.0 m.

As for the method the invention provides a method for producing a decorated surface-structured laminate or for producing a decorative panel comprising a surface structure substantially matching with the decoration, comprising the steps of:

providing a first carrier plate $T_1$ and applying a decorative layer comprising a first decoration $D_1$ onto the first carrier plate $T_1$;

providing further carrier plates $T_n$ and applying further decorative layers comprising decorations $D_n$ which are different from the decorations $D_1$ and $D_{n-1}$;

immediately sequentially supplying the carrier plates $T_1$ to $T_n$ provided with the decorations $D_1$ to $D_n$ as a material to be pressed $G_n$ to a press having a press plate arrangement according to any of claims 1 to 7, wherein the carrier plates are supplied such that to each support plate $T_n$ a corresponding press plate $P_n$ is associated;

reading the positioning mark of the respective press plate $P_n$ and aligning the material to be pressed $G_n$ such that the decoration $D_n$ is aligned synchronously with the structure $S_n$ of the press plate $P_n$; and compressing the material to be pressed $G_n$ by means of the press plate $P_n$ while introducing a structure $S_n$ synchronized with the decoration $D_n$ in the material to be pressed $G_n$.

The method according to the invention thus allows an easy and cost-effective production of decorative panels with a high variance of the decoration and of the surface structure without requiring a respective retrofitting of a press.

According to a preferred embodiment of the method an isobaric press is used as a press, which preferably operates in a pressure range between ≥1.5 MPa and ≤8 MPa, more preferably between ≥2.5 MPa and ≤6 MPa.

According to an embodiment of the method it is provided that prior to the supply of the material to be pressed $G_n$ a top and/or wear-resistant layer is applied onto the decorative layer. Then by means of the structured press plate as a die a surface structure can be produced in such a top and/or wear-resistant layer.

Herein, it may be provided that the top and/or wear-resistant layer includes hard materials such as titanium nitride, titanium carbide, silicon nitride, silicon carbide, boron carbide, tungsten carbide, tantalum carbide, alumina (corundum), zirconium oxide or mixtures thereof in order to increase the wear resistance of the layer. Herein, it may be provided that the hard material is contained in an amount between 5 wt.-% and 40 wt.-%, preferably between 15 wt.-% and 25 wt.-% in the composition of the top and/or wear-resistant layer. Preferably, the hard material herein has a mean grain diameter between 10 µm and 250 µm, more preferably between 10 µm and 100 µm. In this way in an advantageous manner it is achieved that the composition of the top and/or wear-resistant layer forms a stable dispersion and a decomposition or precipitation of the hard material in the composition of the top and/or wear-resistant layer can be avoided. For forming a corresponding top and/or wear-resistant layer it may be provided that the hard material containing and radiation curable composition is applied in a concentration between 10 g/m² and 250 g/m²' preferably between 25 g/m² and 100 g/m². In this case, the application can be implemented, for example, by means of rollers such as rubber rollers, or by means of pouring devices. In a further embodiment of the invention it may be provided that the hard material is not included within the composition at the time of application of the composition of the top and/or wear-resistant layer, but is scattered in the form of particles onto the applied composition of the wear-resistant layer and subsequently the wear-resistant layer is cured, for example by compressing using a press plate arrangement according to the invention. According to a further embodiment the top and/or wear-resistant layer can comprise means for reducing the static (electrostatic) charging of the finished laminate. For example, it may be provided that the top and/or wear-resistant layer to this end comprises compounds such as choline chloride. Herein, the antistatic agent may, for example, be included in the composition for forming the top and/or wear-resistant layer at a concentration between ≥0.1 wt.-% and ≤40.0 wt.-%, preferably between ≥1.0 wt.-% and ≤30.0 wt.-%.

According to a further embodiment of the invention it can be provided that the decorative layer is applied by means of a direct printing method. The term "direct printing" in the sense of the invention means the application of a decoration directly onto the carrier of a panel or onto an unprinted fiber material layer applied to the carrier. In contrast to the conventional methods in which a decorative layer previously printed with a desired decoration is applied onto the carrier, in direct printing the decoration is printed directly in the course of the panel manufacturing process. Here, different printing techniques such as flexographic printing, offset printing or screen printing may be used. In particular digital printing techniques such as inkjet processes or laser printing processes can be used. In the sense of the invention the term fiber materials means materials such as paper and non-woven fabrics on the basis of plant, animal, mineral or even synthetic fibers as well as cardboards. Examples are fiber materials on the basis of plant fibers and, in addition to papers and non-woven fabrics made of cellulose fibers, boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

According to a further embodiment of the invention it can be provided that prior to the application of the decorative layer a printing substrate is respectively applied onto the carrier plate. To this end it may be provided that a resin layer is applied onto a plate-shaped carrier of the laminate to be produced by means of which an unprinted paper or nonwoven fabric layer is applied, and the resulting layer structure is then calendered at a temperature between ≥40° and ≤250° C. After the calendering process a resin composition is applied, which comprises between ≥5 wt.-% and ≤50 wt.-%, preferably between ≥10 wt.-% and ≤70 wt.-% of a solid material having a mean grain diameter $d_{50}$ between ≥0.01 µm and ≤1 µm. Herein the solid material can comprise at least one compound of the group consisting of titanium dioxide, barium sulfate, barium oxide, barium chromate, zirconium (IV) oxide, silica, aluminum hydroxide, aluminum oxide, iron oxide, iron (III) hexacyanoferrate, chromium oxide, cadmium oxide, cadmium sulfide, cadmium selenite, cobalt oxide, cobalt phosphate, cobalt aluminate, vanadium oxide, bismuth vanadium oxide, tin oxide, copper oxide, copper sulfate, copper carbonate, lead antimonate, lead chromate, lead oxide, lead carbonate, calcium carbonate, calcium sulfate, calcium aluminate sulfate, zinc oxide, zinc sulfide, arsenic sulfide, mercury sulfide, carbon black, graphite or mixtures thereof. By using such solid materials in particular a coloured printing substrate can be provided the colouring of which has a property supporting the decoration printing process. For example, in a decorative design which is to represent a dark wood species, a printing substrate with a brown or brownish base tone should be applied, while in a decorative design that is to represent a light wood species or light-colored stone, a printing substrate with a yellow or white base tone should be applied.

In particular, it can be provided according to the present invention that after the calendering process a resin composition is applied, which includes at least one organic or inorganic pigment selected from the group consisting of Prussian blue, brilliant yellow, cadmium yellow, cadmium red, chromium oxide green, cobalt blue, cobalt coelin blue, cobalt violet, irgazine red, iron oxide black, manganese violet, phthalocyanine blue, terra di sienna, titanium white, ultramarine blue, ultramarine red, umber, kaolin, zirconium silicate pigments, monoazo yellow and monoazo orange, thioindigo, betanaphthol pigments, naphthol AS pigments, pyrazolone pigments, N-acetoacetanilide pigments, azo metal complex pigments, diaryl yellow pigments, quinacridone pigments, diketopyrrolo-pyrrole pigments (DPP), dioxazine pigments, perylene pigments, isoindolinone pigments, copper phthalocyanine pigments, and mixtures thereof.

According to a further embodiment of the method it may be provided that after the calendering process a resin composition is applied, which as a resin component comprises at least one compound selected from the group consisting of melamine resin, formaldehyde resin, urea resin, phenol resin, epoxy resin, unsaturated polyester resin, diallyl phthalate or mixtures thereof. It has surprisingly been found that when using a corresponding resin component in combination with the solid material content in the resin composition a printing substrate can be provided which enables a significantly improved adherence of a top and/or wearing layer applied in a final step, resulting in an improved stability of the laminate. Herein, the resin composition may, for example, include a resin content between ≥50 wt.-% and ≤95 wt.-%, preferably ≥55 wt.-% and ≤80 wt.-%.

Furthermore, it can be provided that after the calendering process a resin composition is applied, which comprises a curing agent, wherein the curing agent is included in the resin composition for example in a concentration between ≥0.05 wt.-% and ≤3.0 wt.-%, preferably ≥0.15 wt.-% and ≤2.0 wt.-%, more preferably between ≥0.5 wt.-% and ≤2.0 wt.-%. The provision of a curing agent in the resin composition enables to optimize the binding or curing behavior of the resin composition in dependence on the paper applied onto the plate-shaped carrier.

The curing agent may, for example, be a solution of organic salts. Preferably, the curing agent has an acidic pH value, preferably between pH≥0.5 and <pH 7.

In particular a so-called latent curing agent can be used as a curing agent. Latent curing agents are characterized in that after their addition to the resin on the one hand a sufficient processing time at room temperature, and on the other hand a shortest possible curing time at the subsequent processing temperatures is achieved. The effect of latent curing agents is based on the fact that they are ineffective at normal temperatures and release an acid only at elevated temperatures or due to a chemical reaction which accelerates the curing process. Examples of latent curing agents include inter alia alkyl or alkanolamine salts of the sulfurous acid, amidosulphonic acid, 3-chloro-1,2-propanediol, p-toluenesulfonic acid, morpholine, ammonium sulfate, ammonium chloride, ammonium sulfite, ammonium nitrate, ethanolamine hydrochloride, dimethylethanolammonium sulfite or diethanolammonium sulfamate. In particular, the curing agent may be an aqueous, preferably nonionic solution. An example of a suitable curing agent is MH-180 B (Melatec AG, Switzerland). After the calendering process the resin composition may, for example, be applied with an application quantity between ≥5 g/m² and ≤40 g/m², preferably ≥10 g/m² and ≤30 g/m².

The method according to the invention by use of the press plate arrangement according to the invention can in particular be used for manufacturing decorative panels.

The term decorative panel in the sense of the invention means wall, ceiling or floor panels comprising a decoration applied onto a carrier plate. Decorative panels are used in a variety of ways both in the field of interior design of rooms and for decorative cladding of buildings, for example in exhibition stand construction. One of the most common uses of decorative panels is their use as a floor covering. Herein, the decorative panels often comprise a decoration intended to replicate a natural material.

Examples of such replicated natural materials are wood species such as maple, oak, birch, cherry, ash, walnut, chestnut, wenge or even exotic woods such as Panga Panga, mahogany, bamboo and bubinga. In addition, often natural materials such as stone surfaces or ceramic surfaces are replicated.

The method according to the invention can herein be used for producing a decorative panel, wherein the material to be pressed is cut parallel and/or orthogonal to the longitudinal axis to a predetermined length and/or width after the pressing process.

Thus, the laminate is produced as a large format plate, which only subsequently is cut to a desired final size. Herein, it may be in particular be provided that the carrier plate is profiled prior to the application of the decorative layer onto the side to be provided with the decorative layer in the region of the cuts to be provided, wherein the profile has a bleed allowance for the cuts to be provided. This enables that the profiled regions of the carrier plate are taken into account in advance during the application of the decoration and that the entire visible surface of the later decorative panel is provided with a decoration.

In profiling in the sense of the invention it may be provided that by means of suitable material removing tools at least in a portion of the edges of the decorative panel a decorative and/or functional profile is introduced. Here, a functional profile, for example, means the introduction of a groove and/or tongue profile in an edge in order to make decorative panels connectable to each other by means of the introduced profiles. A decorative profile in the sense of the invention, for example, is a chamfer formed at the edge region of the decorative panel, for example, in order to simulate a joint between two interconnected panels, such as for example in so-called wide planks.

By partially profiling the decorative panel not all profiles to be provided in the finished panel are produced, but only part of the profiles to be produced, while other profiles are produced in a subsequent step. Thus, it may be provided, for example, that the decorative profile to be provided in a panel, such as a chamfer, is produced in one step, while the functional profile, e.g. groove/tongue, is produced in a subsequent step.

In particular, it may be provided in the inventive use of the method that the decorative panels subsequently to the cutting process are provided with a profile at at least one edge by means of which individual profiles can be releasably connected to each other. Here, particularly preferably it may be provided that profiles are produced such that the individual panels can be connected to each other substantially without tools, in particular by means of a so-called fold-down technology.

FIG. 1 shows an embodiment of a press plate arrangement 100 according to the invention adapted for producing a decorative panel. The press plate arrangement 100 comprises a plurality of press plates $P_1$ to $P_n$, 111, 112, 113, 114.

The press plates 111, 112, 113, 114 have a structure for introducing surface structures in a material to be pressed, wherein the press plates $P_1$ to $P_n$ 111, 112, 113, 114 have structures $S_1$ to $S_n$ 121, 122, 123, 124 which are different from one another and are connected to each another via their end faces (e.g., 131, 134). Here, the first press plate $P_1$ 111 and the last press plate $P_n$ 114 are connected to each another via their end faces 131, 134 so that the press plate arrangement 100 as a whole forms a closed belt structure. The press plates 111, 112, 113, 114 comprise optical positioning marks 141, 142, 143, 144, by means of which the position of a press plate 111, 112, 113, 114 relative to a material to be pressed can be determined. At the joints between the end faces of the press plates 111, 112, 113, 114 connecting areas 150 are formed. When using the press plate arrangement in a manufacturing process the material to be pressed is aligned in consideration of the positioning marks 141, 142, 143, 144 relative to the press plates 111, 112, 113, 114 such that the connecting area 150 between two press plates is disposed in a gap between the material to be pressed.

Figure 2:
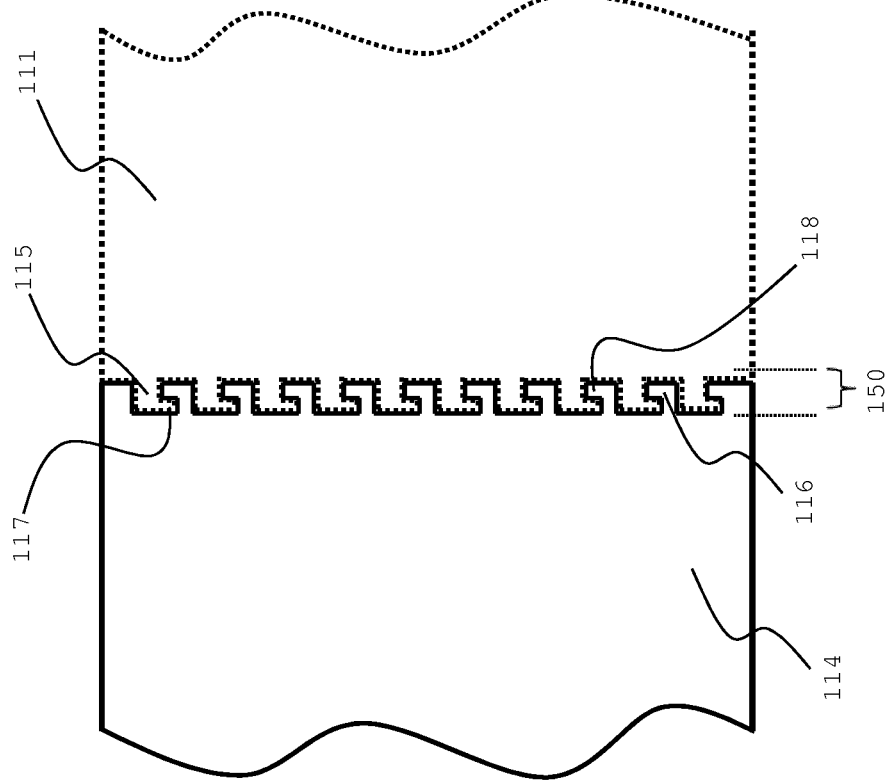
FIG. 2 shows in a detailed view an embodiment of form-fitting interlocking form elements which can be provided at the end faces of the press plates.

FIG. 2 is a detail view of form-fitting interlocking form elements 115, 116 which can be provided at the end face 131, 134 of two press plates 111, 114 to be connected to each other. The form elements 115, 116 comprise undercuts 117, 118, by means of which they can be hooked into each other. Thus, a connecting area 150 is formed.

The invention claimed is:

1. Method for producing a decorative panel comprising a surface structure substantially matching with the decoration, comprising the steps of:
    providing a first carrier plate $T_1$ and a applying a decorative layer comprising a first decoration $D_1$ onto the first carrier plate $T_1$;
    providing further carrier plates $T_n$ and applying further decorative layers comprising decorations $D_n$ which are different from the decorations $D_1$ and $D_{n-1}$;
    immediately sequentially supplying the carrier plates $T_1$ to $T_n$ provided with the decorations $D_1$ to $D_n$ as a material to be pressed $G_n$ to a press having a press plate arrangement comprising a plurality of press plates $P_1$ to $P_n$, wherein the press plates have a structure for introducing surface structures in a material to be pressed, characterized in that the press plates $P_1$ to $P_n$ are connected to each other via their end faces, wherein the first press plate $P_1$ and the last press plate $P_n$ are connected to each other via their end faces such that the press plate arrangement as a whole forms a closed belt structure, wherein the carrier plates are supplied such that to each carrier plate $T_n$ a corresponding press plate $P_n$ is associated;
    reading the positioning mark of the respective press plate $P_n$ and aligning the material to be pressed $G_n$ such that the decoration $D_n$ is aligned synchronously with the structure $S_n$ of the press plate $P_n$;
    wherein n is $\geq 4$; and
    compressing the material to be pressed $G_n$ by means of the press plate $P_n$ while introducing a structure $S_n$ synchronized with the decoration $D_n$ in the material to be pressed $G_n$.

2. Method according to claim 1 wherein prior to supplying the material to be pressed $G_n$ a top and/or wear-resistant layer is applied onto the decorative layer.

3. Method according to claim 1, wherein the decorative layer is applied by means of a direct printing process.

4. The method of claim 1 wherein the material to be pressed after compressing is cut parallel and/or orthogonal to the longitudinal axis to a predetermined length and/or width.

5. The method of claim 4 wherein the carrier plate is profiled prior to the application of the decorative layer on the side to be provided with the decorative layer in the area of the cuts to be provided, wherein the profile includes a bleed allowance for the cuts to be provided.

6. The method of claim 4 wherein the decorative panels after the cutting process are provided with a profile at at least one edge, by means of which individual profiles can releasably be connected to each other.

7. The method according to claim 1, wherein the press plates $P_1$ to $P_n$ comprise structures $S_1$ to $S_n$ which are different from each other.

8. The method according to claim 1, wherein the press plates are connected to each other at their end faces by a material closure.

9. The method according to claim 1, wherein the press plates are releasably connected to each other at their end faces.

10. The method according to claim 1, wherein the press plates comprise form-fitting interlocking form elements at their end faces, which are offset from each other.

11. The method according to claim 10, wherein the form-fitting interlocking elements comprise undercuts.

12. The method according to claim 10, wherein the form-fitting interlocking forming elements are configured as hook elements.

13. The method according to claim 1, wherein the press plates comprise positioning marks by means of which the position of a press plate relative to a material to be pressed can be determined.

14. The method according to claim 13, wherein the positioning marks are optical, magnetic and/or electronic marking means.

* * * * *